United States Patent [19]

Bosco et al.

[11] 4,279,941

[45] Jul. 21, 1981

[54] LOW-FAT, BUTTER-FLAVORED SPREAD AND PROCESS

[75] Inventors: Peter M. Bosco, Brookfield Center; William L. Sledzieski, Norwalk, both of Conn.

[73] Assignee: Standard Brands Incorporated, New York, N.Y.

[21] Appl. No.: 95,626

[22] Filed: Nov. 19, 1979

[51] Int. Cl.³ .......................... A23D 3/00; A23D 5/00
[52] U.S. Cl. .................................. 426/602; 426/603; 426/604; 426/804
[58] Field of Search ................ 426/602, 603, 604, 804

[56] References Cited

U.S. PATENT DOCUMENTS

| | | | |
|---|---|---|---|
| 2,808,336 | 10/1957 | Kalish | 426/602 |
| 3,117,010 | 1/1964 | Geisler | 426/602 |
| 3,223,532 | 12/1965 | Pinkalla et al. | 426/602 |
| 3,360,378 | 12/1967 | Spitzer et al. | 426/604 |
| 3,437,494 | 4/1969 | Loter et al. | 426/602 |
| 3,483,004 | 12/1969 | Bauer et al. | 426/602 |
| 3,533,802 | 10/1970 | Cooper et al. | 426/602 X |
| 4,107,343 | 8/1978 | Petricca | 426/570 X |
| 4,115,598 | 9/1978 | Moran | 426/604 |
| 4,146,652 | 3/1979 | Kahn et al. | 426/602 X |

Primary Examiner—Robert A. Yoncoskie
Attorney, Agent, or Firm—Richard Kornutik

[57] ABSTRACT

Disclosed are a low-fat, butter-flavored spread and a process for preparing it. The spread is solid at 40° F., preferably at 70° F., and will preferably comprise: from 10 to 30% of a dispersed fat; a continuous aqueous phase containing an emulsion stabilizer; and an emulsifier system comprising a lipophilic emulsifier and a hydrophilic emulsifier. According to a preferred aspect of the process: the ingredients are emulsified at a temperature elevated sufficiently to maintain the fat in the liquid state; the emulsion is rapidly cooled; and, the cooled emulsion is then agitated to promote crystallization of the fat and enhance solidification. The product realistically simulates the flavor, texture, mouthfeel, appearance, and stability of butter, yet reduces the caloric density by from 50 to 90%.

30 Claims, 3 Drawing Figures

LOW-FAT, BUTTER-FLAVORED SPREAD AND PROCESS

BACKGROUND OF THE INVENTION

The present invention relates to low-fat content, butter-flavored spreads which simulate the flavor, texture, mouthfeel, appearance, and stability of butter and margarine. More particularly, the present invention relates to diet products of this type having a reduction in caloric density of from 50 to 90%, and to processes for preparing them.

The art is replete with prior art attempts to provide low-fat butter or margarine substitutes. Among these is U.S. Pat. No. 3,457,086 to Josefowicz, et al. which teaches the production of a protein-free spread which can contain as low as 35% fat. The patent states that observance of specified conditions is necessary to maintain the emulsion in the water-in-oil form. Unfortunately, products of this type tend to have a watery flavor because of their high water contents and the absence of milk proteins which help impart the desirable butter-like taste of margarine or butter, but which cannot be tolerated in the product because of their emulsion de-stabilizing effect. Moreover, the high water contents tend to make emulsions of this type rapidly break down on hot foods, tending to make foods like toast become soggy and unappetizing. Also, while some consumers have found it convenient to buy large quantities of margarine or butter at sale prices and then freeze them, low-fat spreads based on water-in-oil emulsions cannot tolerate freezing. Upon thawing, the emulsion breaks down with consequential release of its water phase.

Some recent patents suggest that water-in-oil emulsions can be formed with fat contents as low as 25 or 30% to successfully simulate butter or margarine. This has always presented severe problems because the external fat phase tends to become stretched out and the aqueous phase becomes more predominant. For example, U.S. Pat. No. 4,103,037, to Bodor et al. discloses a process for preparing a proteinaceous low-fat spread which is stabilized by a gelling agent, such as gelatin, having a melting point sufficiently high to withstand room temperature yet low enough to allow it to melt in the mouth. This gelling agent ties up all available water into minute solid particles which are dispersed throughout a continuous fat phase. These meltable particles contain the water soluble flavors and salt, and further diminish the flavor impact of these components which are already diminished due to the nature of the water-in-oil emulsion.

The adverse effect of water-in-oil emulsions on flavor impact is so pronounced that this is the problem which was dealt with by Moran in U.S. Pat. No. 4,115,598. Therein, flavor impact for a low-fat spread comprising 35 to 65% by weight of a continuous fat phase and dispersed aqueous phase is said to be improved by specially formulating the water-in-oil emulsion to destabilize in the mouth to release the water-soluble flavors.

Further representative of the state of the art of low-fat spreads is U.S. Pat. No. 4,071,634 to Wilton et al. This patent states that low-fat spreads are generally emulsions of the water-in-oil type and can have fat contents reduced to as low as 30%, as compared to 80% for margarine. It is indicated that problems related to inferior organoleptic properties or emulsion stability are often encountered in these types of products. Apparently, products of this type which are sufficiently stable, have flavor release problems; while those with good flavor release, are insufficiently stable to keep the aqueous phase adequately dispersed under storage conditions. To remedy this problem, Wilton et al. propose a complex emulsion wherein a discontinuous aqueous phase contains phosphatides and a discontinuous, second fatty phase dispersed therein.

Among other attempts to provide low-fat spreads is the approach described by Nijhoff in U.S. Pat. No. 3,418,133. Therein, edible spreads are described wherein a portion of a fat content is replaced by an aqueous solution of carboxymethylcellulose. In Example 2, a margarine substitute is described which is prepared from a 50/50 mixture of margarine and aqueous solution. This product presumably has a fat content of about 40% (i.e., one half that of margarine); however, the type of emulsion is not identified and the emulsions do not remain stable and solid at room temperature.

U.S. Pat. No. 3,809,764 to Gabby et al. discloses essentially fat-free products which are characterized as "emulsions" of polyglycerol fatty esters with an aqueous hydrophilic colloid. Among the products, are those which are said to simulate margarine yet contain fat contents of less than 5%. These products, while fairly flavorful and fat mimetic, are significantly different in overall flavor, texture, mouthfeel, and appearance from either margarine or butter.

Richardson, in U.S. Pat. No. 4,156,021, also discloses low-fat compositions said to simulate margarine. Example III of this patent employs about 7% corn oil. The emulsions are said to be of the oil-in-water type but obtain much of their body from high levels of cellulose fiber, which also adds its characteristic impact on mouthfeel which is significantly different from that of fat.

Other workers have disclosed stable emulsified products containing oil-in-water emulsions, wherein sugars were employed; however, the necessity for sugar made them sweet and clearly distinct from butter or margarine. Among these is U.S. Pat. No. 3,958,033 to Sims et al. which relates to shelf-stable, clear, liquid emulsions. The sugar was essential in these formulations to supply the desired sweetness, adjust the refractive index of the aqueous phase to improve product clarity, and enhance shelf stability. Similarly, in U.S. Pat. No. 4,146,652, Kahn et al. describe stable oil-in-water emulsions containing high sugar levels to obtain microbiological stability. In U.S. Pat. No. 4,107,343 to Petricca the sugar was required for sweetness demanded of the whipped products involved. Thus, despite the disclosure by these patents of stable oil-in-water emulsions with fat contents in the 10 to 30% range, and the disclosure by Sims et al. in Example XXII of a maple-flavored spread, and a confectionary butter cream in Example I of Kahn et al., there is no solution afforded the skilled worker in the low-fat margarine or butter substitute art seeking a product which can successfully reproduce the flavor, texture, mouthfeel, stability and appearance of butter or margarine at a caloric density of 10–45 calories per 14 gram serving, as compared to the 50 or more calories per similar serving for the best low-fat, butter-flavored spreads commercially available to date.

SUMMARY OF THE INVENTION

It is an object of the present invention to provide an improved low-fat, butter-flavored spread and a process for preparing it.

It is another object of the invention to provide a low-fat, butter-flavored spread, and a process for preparing it wherein the product can include dairy proteins to enhance the flavor and nutrition of the product without adversely affecting emulsion stability.

It is a more specific object of the present invention to provide a low-fat, butter-flavored spread and a process for preparing it, wherein the spread is solid at refrigerator temperature and remains solid at serving temperatures for at least several hours.

It is a further specific object of the invention to provide a low-fat, butter-flavored spread and a process for preparing it, wherein the product remains solid and easily spreadable at all temperatures within the range of from 32° to 75° F., yet melts down quickly in the mouth to release flavor without imparting a "waxy" mouthfeel and remains as a stable emulsion at temperatures up to 180° F.

It is yet a further specific object of the present invention to provide a low-fat, butter-flavored spread and a process for preparing it, wherein the emulsion forming the spread remains stable when required during freeze/thaw cycling.

It is another specific object of the present invention to provide a low-fat, butter-flavored spread and a process for preparing it, wherein the spread is based on an oil-in-water emulsion which is stable at refrigerator temperature for at least 6 months and at room temperature for at least 24 hours.

It is yet another and more specific object of the present invention to provide a low-fat, butter-flavored spread and a process for preparing it, wherein the spread is based on an oil-in-water emulsion and remains solid and stable for reasonable periods at room temperature as well as being solid and stable at refrigerator temperature.

It is a further and yet more specific object of the present invention to provide a low-fat, butter-flavored spread and a process for preparing it, wherein the spread is solid at room temperature for at least 5 hours and is based on an oil-in-water emulsion which remains stable for at least 24 hours at room temperature and for at least 6 months at refrigerator temperature, yet has a caloric density of less than 50, and preferably about 25, calories per 14 gram serving.

It is another object of the invention to provide a low-fat, butter-flavored spread and a process for preparing it, wherein the spread otherwise imparts all of the desirable attributes and characteristics of butter or margarine.

These and other objects are achieved according to the present invention which provides an improved low-fat, butter-flavored spread and a process for preparing it. The spread, in its broad aspects, comprises: a dispersed phase comprising from 5 to 40% fat, based on the weight of the spread; a continuous aqueous phase including a stabilizer; and an emulsifier system comprising a combination of a lipophilic emulsifier and a hydrophilic emulsifier; the relative and total amounts of the emulsifiers and the stabilizer being effective to provide a stable emulsion and a product which is solid at 40° F.

The process in its broad aspects comprises: preparing an oil-in-water emulsion comprising the ingredients for the spread as defined above, and cooling the emulsion under conditions effective to solidify it to form a product which is solid at 40° F.

BRIEF DESCRIPTION OF THE DRAWINGS

The invention will be better understood and its advantages will become more apparent from the following detailed description, especially when read in light of the following drawings, wherein.

DETAILED DESCRIPTION

Figure 1:
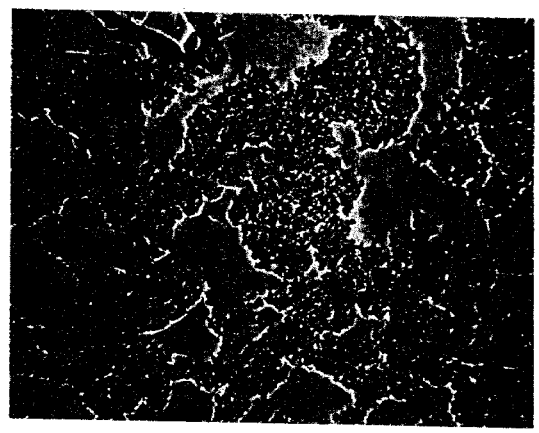
FIG. 1 is a photomicrograph, taken at 225 times magnification, of an emulsion according to the invention after solidification into the spread according to the invention.

The products of the invention, which are prepared by the process of the invention, effectively simulate natural butter and good quality margarine in flavor, texture, appearance, mouthfeel and stability, yet have caloric densities of less than 50, and preferably about 10 to 35, calories per 14 gram serving compared to about 100 for margarine and butter. The spreads are solid at refrigerator temperature and remain so even after standing for at least 2, and preferably 5, hours at a room temperature of 70° F. The spreads, which are based on stable oil-in-water emulsions, remain spreadable at normal refrigerator temperature, and melt quickly in the mouth to release flavor without imparting a waxy texture or mouthfeel.

The term "butter-flavored" is meant to include compositions flavored to simulate butter by both naturally-derived and simulated butter flavors. This term is used in its literal sense and is not meant to be otherwise restricted. A composition is considered "butter-flavored" when an expert panel trained to evaluate flavors of this type characterizes the product as "buttery" or "butter-like" in flavor.

The term "stable emulsion" identifies those emulsions which do not undergo any noticeable change in stability, due to water or fat separation or otherwise, during storage in moistureproof containers at a temperature of 40° F. or below for 6 months, and which will also remain stable when stored at a room temperature of 70° F. for a period of at least one day. Preferably, the emulsions of the present invention remain stable after melting, even at elevated temperatures of 180° F. or more.

The term "solid" is used in its normal sense, to mean the product does not flow under its own weight. Included within the scope of this term are plastic, spreadable compositions which, while not susceptible to flow under their own weight in small quantities, are easily spread with a knife. The more realistic-appearing products of the invention will exhibit penetrometer readings at 40° F. within the range of about 60 to 250 units, using a standard penetrometer cone, having a 2.5 inch diameter and a 45° angle, with 47.5 grams added weight at a 5-second interval. Preferably, the penetrometer readings will be within the range of from 100 to 200 units.

The products of this invention can be aerated if desired; however, it is an advantage of the invention that the products do not have to contain any significant quantity of air or inert gas to stiffen their structures and provide a firmer consistency. Thus, unlike many prior art products, the product itself, probably due to its unique microstructure, provides the solid consistency and there is no dependence upon the use of a gas to distend the emulsion structure to effect stiffening or solidification. To provide the best overall texture, the degree of gas incorporation is preferably kept to less than 40%, and most preferably less than 20%, by volume.

Similarly, in distinction with some of the prior art compositions, those of the present invention do not depend upon the presence of protein to obtain the solid texture or the superior mouthfeel; however, they can contain the proteins if desired.

Figure 2:
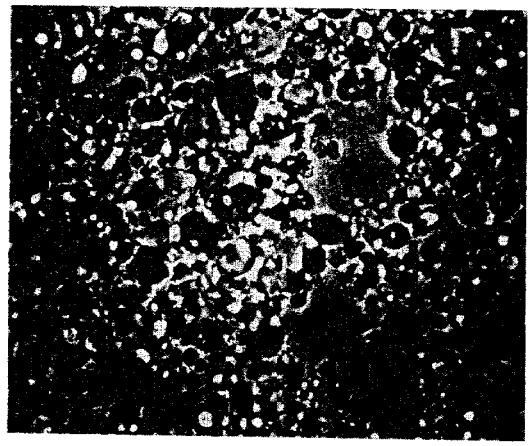
FIG. 2 is a photomicrograph, taken at 500 times magnification.

FIGS. 1 and 2 are photomicrographs taken of a representative emulsion prepared in Example 1. FIG. 1 was made at 225 times magnification and FIG. 2 was made at 500 times. Both show the unique microstructure of the product. It is believed that the chains of small bead-like oil droplets entangle, or coalesce or fuse at points, to form small interstices wherein the aqueous phase is physically trapped as well as being bound to some extent by the attraction for the oil due to the presence of the emulsifiers and stabilizers. The thickened state of the aqueous phase contributed by the stabilizers is also believed to aid in maintaining the unique solid structure of the products of this invention, even though the degree of thickening would not itself be sufficient to prevent it from flowing were it not for the other effects of the composition of the invention. These products are so stable that the emulsions do not separate even after standing for 24 hours or more at room temperature.

The ingredients which are essential to the formation of the product are: (1) fat which is suitably selected to have a Solids Fat Index (SFI) which enables the formation of a solid product at 40° F., (2) a water-soluble emulsion stabilizer, and (3) an effective emulsifier system comprising both lipophilic and hydrophilic emulsifiers.

The fat can be present in amounts within the range of from 5 to 40 percent based on the weight of the spread, but is preferably present in an amount of from 10 to 30 percent of weight of the spread.

The term "fat" as used herein is intended to include all edible, fatty acid triglycerides regardless of origin or whether they are solid or liquid at room temperature. Thus, the term "fat" includes normally liquid and normally solid vegetable oils and animal fats. Typical of the vegetable oils which are included are the usual vegetable oils such as soybean oil, corn oil, coconut oil, cottonseed oil, peanut oil, safflower oil, palm kernel oil, sunflower oil, palm oil, and rapeseed oil. The preferred fats for use in the invention will comprise partially hydrogenated vegetable oils, and will most preferably be selected from the group consisting of soybean oil, corn oil, coconut oil, cottonseed oil, peanut oil, palm oil, palm kernel oil, safflower oil, sunflower oil, rapeseed oil, and mixtures of these. Preferred among these are those partially-hydrogenated vegetable oils which have an SFI profile within the following ranges:

| Temp. | Broad | Preferred |
| --- | --- | --- |
| 50° F. | 40–80% | 50–70% |
| 70° F. | 25–50% | 30–40% |
| 92° F. | <10% | <5% |

Particular, suitable fats are 92° F. Wiley melting point partially-hydrogenated coconut oils sold under the trademarks Pureco 92 by Capitol City Products; Hydrol 92 by SCM Corporation; Victory 92 by Humko Div. Kraft Inc.; and Cobee 92 by PVO International, Inc.

The fat will preferably be selected to provide a solid product at 70° F., but will substantially completely melt in the mouth. Where necessary to increase the solids content at 40° F. or 70° C., an amount of a fat having a higher solids content can be added. Fats like hard stock stearin and cottonseed or soybean flakes have this ability, however, they remain solid and impart a waxy mouthfeel at eating temperature. Thus, while they can be employed to provide a desirable effect on texture, they should not be employed in large amounts.

The use of water-soluble emulsion stabilizers is essential to provide the necessary stability. These can be any of those known to the art for this purpose and will preferably be hydrophilic colloids, and can be selected from the group consisting of microcrystalline cellulose, carageenin, guar gum, alginate, xanthan gum, methyl cellulose, carboxymethyl cellulose, ethyl cellulose, hydroxypropylmethyl cellulose, dextrins, starch, gelatin, locust bean gum, soy protein isolate, pectin and the like, and mixtures of these. Commercial stabilizers available from Polak's Frutal Works, Inc. and identified by the manufacturer as Frimulsion Q8 and Frimulsion 10 have been found effective, especially when used in combination. The Q8 product is a blend of modified food starch, locust bean gum, guar gum, gelatin and pectin, and is preferably employed at a weight ratio within the range of from about 1:1 to 3:1 to the Frimulsion 10 which is a blend of locust bean gum and guar gum.

The stabilizer can be employed in any amount effective under the conditions of processing and with the particular ingredients. It has been found, however, that levels of about 0.1 to 3.0 percent, based on the total weight of the composition, are particularly effective. In addition to their emulsion stabilizing function, these materials also have a viscosity-increasing effect on the emulsion. However, this effect is not sufficient in and of itself to control the large amounts of water present in these emulsions. Thus, the present invention, unlike the approach taken by Bodor et al. in U.S. Pat. No. 4,103,037, does not depend upon a gelling agent to solidify the aqueous phase.

The composition of the invention further comprises an emulsifier system employing both lipophilic and hydrophilic emulsifiers. The relative and total amounts of the emulsifiers are selected to be effective to provide a stable emulsion and a product which is solid at 40°. Typical of effective levels will be levels of from 0.3% to 4.0%, based on the weight of the total composition of the total emulsifier system which employs each of the hydrophilic and lipophilic emulsifiers at levels of at least 0.05%, on the same basis. The lipophilic emulsifier will typically have an HLB (hydrophile-lipophile balance), of less than 7, and the hydrophilic emulsifier will typically have an HLB of from 10 to 20, preferably from 11 to 17.

The emulsifier system is preferably present at a level of from 0.5% to 2%, and the lipophilic and hydrophilic emulsifiers are preferably each present at levels of at least 0.10%, all percentages on a formula weight basis.

The hydrophilic emulsifier will preferably comprise a member selected from the group consisting of polyoxyethylene (20) sorbitan monostearate, polyoxyethylene (20) sorbitan monooleate, and mixtures of these.

These emulsifiers, commonly known as polysorbate 60 and polysorbate 80, respectively, are preferred in the practice of this invention; however, it is believed that other hydrophilic emulsifiers with an HLB of between 10 and 20, preferably between 11 and 17, and most preferably 13 and 16, will be operable. Among other suitable emulsifiers are the polyglycerol esters of fatty acids, such as octaglycerol monooleate. Also suitable are other of the polysorbates, such as polysorbate 65 which is otherwise known as polyoxyethylene (20) sorbitan tristearate. Various factors such as off-flavor, off-color and generally less desirable qualities of these other materials for use in foods make the aforementioned hydrophilic emulsifiers the most desirable choice in the practice of this invention. Polysorbate 60 and 80 are the most preferred because they provide a stiffness and spreading quality, especially a cold fracture quality, most like butter and margarine.

Polysorbate 60, polyoxyethylene (20) sorbitan monostearate, is a mixture of stearate and palmitate partial esters of sorbitol and sorbitol anhydrides condensed with approximately 20 moles of ethylene oxide ($C_2H_4O$) for each mole of sorbitol and its mono- and dianhydrides. It is a lemon to orange colored, oily liquid or semi-gel having a faint characteristic odor and a warm, somewhat bitter taste. It is soluble in water, aniline, ethyl acetate, toluene, and is soluble at low levels in mineral and vegetable oils. Polysorbate 60 is commercially available under the trademarks Tween 60 from ICI-Atlas, SVS-18 from Hodag, Inc., Drewpone 60 from PVO International Inc., Durfax 60 from SCM Corporation, and GYSPS-20 from Glyco, Inc.

Polysorbate 80, polyoxyethylene (20) sorbitan monooleate, is a mixture of oleate partial esters of sorbitol and sorbitol anhydrides condensed with approximately 20 moles of ethylene oxide ($C_2H_4O$) for each mole of sorbitol and its mono- and dianhydrides. It is a yellow to orange colored, oily liquid having a faint, characteristic odor and a warm, somewhat bitter taste. It is very soluble in water, producing an odorless, nearly colorless solution, and is soluble in ethanol, fixed oils, ethyl acetate and toluene. Polysorbate 80 is commercially available under the trademarks Tween 80 from ICI-Atlas, SVO-9 from Hodag, Inc., Drewpone 80 from PVO International Inc., Durfax 80 from SCM Corporation and GYSPO-20 from Glyco, Inc.

Polysorbate 65, polyoxyethylene (20) sorbitan tristearate, is not as preferred as polysorbate 60 or polysorbate 80, but still provides an acceptable product. It is a mixture of stearate and palmitate partial esters of sorbitol and its anhydrides condensed with approximately 20 moles of ethylene oxide ($C_2H_4O$) for each mole of sorbitol and its mono- and dianhydrides. It is a tan, waxy solid having a faint, characteristic odor and a waxy, somewhat bitter taste. It is soluble at low levels in mineral and vegetable oils; at higher levels in mineral spirits, acetone, ether, dioxane and methanol; and is dispersible in water and carbon tetrachloride. Polysorbate 65 is commercially available under the trademarks Tween 65 from ICI-Atlas, Drewpone 65 from PVO International, Inc., Durfax 65 from SCM Corporation, and GYSPTS-20 from Glyco, Inc.

The lipophilic emulsifier of the emulsifier system will preferably comprise a member selected from the group consisting of mixed fatty acid monoglycerides; mixed fatty acid diglycerides; mixtures of fatty acid mono- and diglycerides; lipophilic polyglycerol esters; glycerol esters, such as glyceryl monooleate, glyceryl dioleate, glyceryl monostearate, glyceryl distearate, glyceryl monopalmitate, and glyceryl dipalmitate; lactylated esters such as glyceryl-lacto esters of fatty acids; propylene glycol esters such as propylene glycol monopalmitate, propylene glycol monostearate, and propylene glycol monooleate; sorbitan esters such as sorbitan monostearate, sorbitan trioleate, sorbitan tripalmitate, sorbitan tristearate, and sorbitan sesquioleate; fatty acids or their soaps such as stearic acid, palmitic acid, and oleic acid; and mixtures thereof. Here, as in the case of the hydrophilic emulsifier, there is no known criticality in the use of any particular lipophilic emulsifier. Thus, it is fully intended that other equivalent materials can be employed with satisfactory results. However, those specifically identified above, especially those selected from the group consisting of lipophilic polyglycerol esters, mono- and diglycerides, propylene glycol esters, lactylated esters, and mixtures of these, are preferred from the standpoint of taste and effectiveness.

The products of the invention will most closely simulate butter and margarine when they are suitably colored and flavored with those materials known to the art for these purposes. Examples of coloring agents are beta carotene, annatto, turmeric, paprika and FD&C dyes. Typically, the colors will be dissolved or dispersed in oil or the water phase to expedite blending. Representative of the flavors and/or flavor enhancers will be sodium chloride, lactones, lipolyzed butter oils and starter distillates; diacetyl, 2-octanone, and other ketones; butyric acid, hexanoic acid, and other free fatty acids; esters of butyric acid; delta-hydroxy acids and their glycerol esters; and mixtures of any of these with other known dairy, buttery, or like flavors or flavor notes. It is an advantage of the invention that flavors have a very pronounced impact as compared to prior art water-in-oil compositions.

In addition to emulsion stability, the products of the invention are preferably stable against microbiological and oxidative deterioration. To control mold and yeast growth, the products desirably contain one or more preservatives such as benzoic acid, sorbic acid, phosphoric acid, lactic acid and the soluble salts of these and other like materials. Preferred as antimicrobials are potassium sorbate, sodium sorbate, potassium benzoate, sodium benzoate and phosphoric acid. The pH of the aqueous phase is desirably maintained at a value below 6.0, and preferably within the range of 5.0 to 5.9, to provide effective microbial control and good flavor with the lowest necessary levels of preservatives. Additional stability against oxidative deterioration at higher temperatures may be obtained by the use of the usual anti-oxidants, typical among which are normal propyl gallate, the several tocopherols, butylated hydroxyanisole (BHA), butylated hydroxytoluene (BHT), nordihydroguaiaretic acid (NDGA), tertiary-butylhydroquinon (TBHQ), and citric acid.

While the products of the invention do not require proteins to obtain the proper texture or mouthfeel, they are sometimes desired for nutritional reasons as well as their positive contribution to the flavor and physical properties of the product. Additionally, protein can enhance freeze/thaw stability. Among the suitable protein materials are any of those known to the art for similar uses in margarine and margarine substitutes. These can include those derived from vegetable as well as animal sources. Thus, vegetable protein isolates such as those derived from soy, peanut, cottonseed, alfalfa, pea, and the like; milk-protein containing materials such as non-fat dry milk, whey, caseinates, casein and delactosed whey; and other proteins, can be employed in desired amounts. One suitable type of protein is that sold under the Melotein MP-14P trademark by Dairyland, Inc. These products are spray dried blends of milk proteins such as sweet dairy whey and caseinates. Typically, they are added in amounts of up to 10% based on the total weight of the spread. Preferred levels will be from 1 to 8% on this basis.

Also added can be any of the vitamins and minerals desired. Preferred among these are vitamins A and D which are normally associated with a butter or margarine product. If desired, these can be added in amounts approximating those in butter or margarine.

Also where desired, a chelating agent such as ethylenediaminetetraacetic acid (EDTA), its salts, such as calcium disodium EDTA or the like can be employed to tie up metal ions which may otherwise detrimentally interact with one or more of the ingredients.

Figure 3:
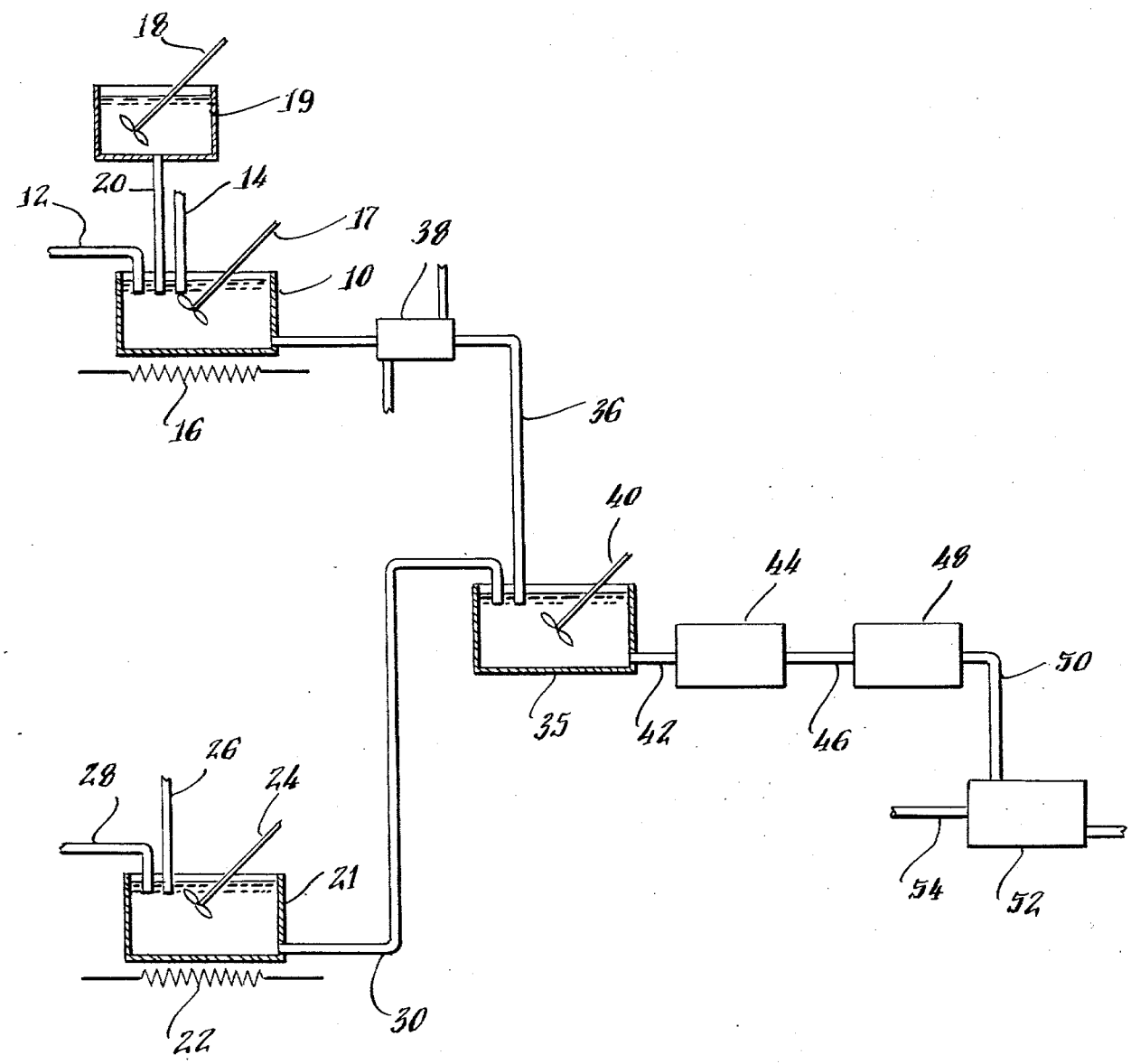
FIG. 3 is a flow diagram showing a preferred process scheme according to the invention.

All of the above ingredients can be formed into the low-fat, butter-flavored spread of the invention by following the preferred process scheme set out in FIG. 3, or otherwise preparing an oil-in-water emulsion comprising the essential ingredients, and then cooling the emulsion under conditions effective to solidify it and form a spread which is solid at 40° F., preferably at 70° F., and most preferably at 75° F.

The flow diagram of FIG. 3 shows the separate preparation of fat and aqueous phases prior to blending and emulsifying them. The water and water-soluble ingredients, such as milk protein solids, salt, and preservatives, are added to mixing vessel 10 by lines 12 and 14, respectively. The vessel may be equipped with a suitable heater 16 which can be a electrical resistance heater, a water or steam jacket, or the like. Alternatively, the water from line 12 can be supplied hot. Typically, the water will be heated to a temperature of about 190° F. to assure complete hydration of the water soluble materials added. Agitation is supplied by mixing device 17. Where the stabilizers, which are water soluble, are mixed with the water at this stage in processing, the shear supplied by the mixing must be intense enough to overcome the normal tendency of these materials to clump together and prevent complete hydration and dispersion. It is preferred, however, to predisperse the stabilizers in a portion of the fat phase prior to contact with water. This can be accomplished by blending with mixing device 18 in vessel 19, and then passing to vessel 10 by line 20.

The fat phase is prepared in a separate vessel 21 which can also be equipped with a suitable heating device 22 and mixing device 24. The fat-soluble materials such as the color, flavor, vitamins, and emulsifiers, if desired, are added at 26 to the fat which is added at 28. The hydrophilic emulsifier will preferably be added to the water phase instead of the fat phase. The fat is maintained at a temperature high enough to assure its liquid character. Temperatures of from about 120° to 190° F., preferably about 130° to 150° F., are effective to provide good solubility of additives and a suitably low viscosity.

The fat phase can be drawn from mixing vessel 21 by line 30 and then passed to vessel 35 wherein it is mixed with the water phase which is supplied by line 36 and may have been cooled to approximately the same temperature as the fat phase by means of heat exchanger 38. Adequate mixing is provided by device 40 which supplies sufficient shear to begin the emulsification of the fat into the water. At the completion of mixing, an emulsion will have been formed which uniformly disperses the fat into droplets within the aqueous phase; however, the droplets are not broken down finely enough to permit emulsion stability.

The rough emulsion prepared in vessel 35 is then passed via line 42 to homogenizer 44 wherein the final emulsion is formed. The emulsion will, at this point, still be at a temperature sufficiently high to maintain the fat in the liquid state. Homogenization will typically be accomplished at a pressure of from 100 to 500, and preferably about 250, atmospheres. Any of the typical homogenizers or colloid mills effective for dairy purposes can be employed in this process. Thus, the Manton-Gaulin 2-stage homogenizer or the Cherry Burrel 2-stage homogenizer can be employed effectively.

From the homogenizer 44, the homogenized emulsion is passed via line 46 to a suitable heat exchanger 48 where it is cooled. The heat exchanger 48 will preferably be of a kind capable of rapidly cooling the emulsion. Typical of the suitable devices are scraped-wall heat exchangers ("A" units), such as those sold under the Votator trademark. Typically, the heat exchanger coolant will be maintained at a temperature of about −20° F. to cool the emulsion rapidly from about 140° to 160° F. to below about 70° F., and preferably below about 40° F.

The cooled emulsion is then preferably passed from the heat exchanger 48 via line 50 to a mixing chamber 52 wherein gentle agitation is maintained internally by a suitable rotating mixing device 54 for a period of time effective to initiate crystallization of the fat and the propagation of the unique physical structure of the product of the invention. The agitation promotes crystallization and enhances solidification. According to the most preferred mode of operation, a series, preferably of about three, "A" units cool the emulsion, and a blender ("B" unit) is positioned at the end of the series, or between two of the "A" units in the series, to aid in promoting crystallization.

The spreads of the present invention can be printed into sticks, formed into pats or filled into tubs. Thus, these spreads, despite their low fat contents and high water contents, have the physical appearance, as well as other characteristics, of high quality margarine or butter.

The following examples are presented for the purpose of further illustrating and explaining the present invention and are not to be taken as limiting in any regard. Unless otherwise indicated, all parts and percentages will be by weight.

EXAMPLE I

This example describes the preparation of a preferred spread according to the present invention, and details the procedure for obtaining the microphotographs shown in FIGS. 1 and 2.

The spread is made from the following materials which are employed in the amounts listed:

| Ingredient | Amount (parts by wt.) |
| --- | --- |
| Coconut oil, 92° F. Wiley melting point | 19.0000 |
| Mono- and diglycerides(a) | 0.5000 |
| Polysorbate 60(b) | 0.5000 |
| Beta carotene (30% in oil) and vitamins | 0.0050 |
| Salt | 1.6500 |
| Butter flavor | 0.0200 |
| Stabilizer(c) | 1.0000 |
| Stabilizer(d) | 0.4000 |
| Water | 76.6743 |
| Potassium sorbate | 0.1300 |

-continued

| Ingredient | Amount (parts by wt.) |
|---|---|
| Sodium benzoate | 0.1000 |
| Phosphoric acid | 0.0150 |
| Calcium disodium EDTA | 0.0057 |

(a)Durem 114
(b)Durfax 60
(c)Frimulsion Q8
(d)Frimulsion 10

An aqueous phase is prepared by heating the water to 190° F. and adding the dry ingredients, and the Frimulsion Q8 and 10 stabilizers predispersed in a portion of the melted fat, to it with agitation. Mixing is continued until the stabilizers are uniformly dispersed and hydrated.

A separate fat phase is prepared by melting the remaining portion of the fat and the emulsifiers at a temperature of about 150° F. The color and flavor are then admixed with the melt to obtain a uniform blend.

The aqueous and fat phases are then blended at about 160° F. to provide an emulsion. The emulsion is then homogenized in a Gaulin Laboratory homogenizer, Model 15M, set at 150 atm. first stage and 100 atm. second stage.

The emulsion is then cooled to 40° F. in about 15 minutes by slowly agitating with a Hobart Model N50 mixer fitted with a wire whip and a jacketed (water/alcohol coolant at approximately −20° F.) 5-quart mixing bowl. The resulting product is transferred to a tub and refrigerated for 24 hours. The resulting solidified spread exhibits a penetrometer reading of 130 units when measured by Krebs Penetrometer with a standard penetrometer cone having a 2.5 inch diameter and a 45° angle, with 47.5 grams added weight at a 5-second interval. (Penetrometer procedures according to ANS-/ASTM D217-68).

The spread is prepared for microphotography by placing a very small amount of product on a glass slide and carefully covering with a cover glass. Photographs at 225 and 500 times magnification are prepared and are reproduced in FIGS. 1 and 2.

The final product is then heated to determine the stability and viscosity of the emulsion at various temperatures. Using a Brookfield RVT Viscometer fitted with a number 1 spindle, the emulsion exhibits the following viscosities at 10 rpm:
 100° F.—880 centipoises
 150° F.—500 centipoises
 200° F.—310 centipoises
The emulsion is stable at all of these temperatures.

The product is tested to determine the type of emulsion by microscopic and colorimetric analysis. Under the microscopic test, a small amount of the product is placed on a microscope slide. A drop of water is then placed near the outer edge of the product. The interface between the product and the water is then observed. If the emulsion becomes diluted, i.e., water from the droplet enters the emulsion, the emulsion is of the oil-in-water type, with the water being the continuous phase. Under the colorimetric test, an intensely colored fruit juice, such as grape, elderberry, raspberry, or the like, is dropped on the surface of the product. If the color is absorbed by the product, the emulsion is of the oil-in-water type. If no color is absorbed, the emulsion is of the water-in-oil type. Under both tests, the emulsion of this example is found to be oil-in-water.

EXAMPLE II

This example describes the preparation of another spread according to the present invention. The details of the procedure are the same as in Example I. The only difference is that dairy solids are added and the proportions of the other ingredients are adjusted accordingly.

The spread is made from the following materials which are employed in the amounts listed:

| Ingredient | Amount (parts by wt.) |
|---|---|
| Coconut oil, 92° F. Wiley melting point | 18.5000 |
| Mono- and diglycerides(a) | 0.5000 |
| Polysorbate 60(b) | 0.5000 |
| Beta carotene (30% in oil) and vitamins | 0.0050 |
| Salt | 1.6500 |
| Butter flavor | 0.0200 |
| Stabilizer(c) | 1.0000 |
| Stabilizer(d) | 0.4000 |
| Water | 73.6743 |
| Potassium sorbate | 0.1300 |
| Sodium benzoate | 0.1000 |
| Phosphoric acid | 0.0150 |
| Whey/caseinate blend(e) | 3.5000 |
| Calcium disodium EDTA | 0.0057 |

(a), (b), (c) and (d): see Example I.
(e)Melotein MP-14P.

The solidified spread exhibits a penetrometer reading of 175 units when measured as in Example I.

EXAMPLE III

This example describes the preparation of another spread according to the present invention, but this time containing about 30% fat. The procedure is the same as in Example I. The spread is made from the following materials which are employed in the amounts listed:

| Ingredient | Amount (parts by wt.) |
|---|---|
| Coconut oil, 92° F. Wiley melting point | 29.0000 |
| Mono- and diglycerides(a) | 0.5000 |
| Polysorbate 60(b) | 0.5000 |
| Beta carotene (30% in oil) and vitamins | 0.0050 |
| Salt | 1.6500 |
| Butter flavor | 0.0200 |
| Stabilizer(c) | 1.0000 |
| Stabilizer(d) | 0.4000 |
| Water | 66.6743 |
| Potassium sorbate | 0.1300 |
| Sodium benzoate | 0.1000 |
| Phosphoric acid | 0.0150 |
| Calcium disodium EDTA | 0.0057 |

(a), (b), (c) and (d): see Example I.

The resulting solidified spread exhibits a penetrometer reading of 166 units when measured as in Example I.

EXAMPLE IV

This example describes the preparation of yet another spread according to the present invention, again employing the procedure of Example I, but this time utilizing only 10% fat. The spread is made from the following materials which are employed in the amounts listed:

| Ingredient | Amount (parts by wt.) |
|---|---|
| Coconut oil, 92° F. Wiley melting point | 9.0000 |
| Mono- and diglycerides(a) | 0.5000 |

-continued

| Ingredient | Amount (parts by wt.) |
| --- | --- |
| Polysorbate 60(b) | 0.5000 |
| Beta carotene (30% in oil) | 0.0050 |
| Salt | 1.6500 |
| Butter flavor | 0.0200 |
| Stabilizer(c) | 1.0000 |
| Stabilizer(d) | 0.4000 |
| Water | 86.6791 |
| Potassium sorbate | 0.1300 |
| Sodium benzoate | 0.1000 |
| Phosphoric acid | 0.0150 |
| Calcium disodium EDTA | 0.0057 |

(a), (b), (c) and (d): see Example I.

The penetrometer reading for the final product is 227 when measured as in Example I.

EXAMPLE V

This example describes the preparation of another spread according to the present invention, but this time utilizing different stabilizers. The spread is made from the following materials which are employed in the amounts listed:

| Ingredient | Amount (parts by wt.) |
| --- | --- |
| Coconut oil, 92° F. Wiley melting point | 20.0000 |
| Mono- and diglycerides(a) | 0.5000 |
| Polysorbate 60(b) | 0.5000 |
| Beta carotene (30% in oil) and vitamins | 0.0035 |
| Salt | 1.6500 |
| Butter flavor | 0.0320 |
| Stabilizer (89% micro-crystalline cellulose and 11% sodium carboxymethyl cellulose)(f) | 2.1000 |
| Water | 74.9613 |
| Potassium sorbate | 0.1300 |
| Sodium benzoate | 0.1000 |
| Phosphoric acid | 0.0250 |

(a) and (b): see Example I.
(f)Avicel 581, FMC, Inc.

The procedure is essentially the same as that of Example I, but differing in that: the water is heated to only 160° F.; and the oil is heated to only 130° F.

The penetrometer reading for the final product is 82 units when measured as in Example I.

EXAMPLE VI

This example describes the preparation of another spread according to the present invention, but this time employing a different emulsifier system. Except for the change in formulation, the process is the same as in Example I. The spread is made from the following materials which are employed in the amounts listed:

| Ingredient | Amount (parts by wt.) |
| --- | --- |
| Coconut oil, 92° F. Wiley melting point | 17.5000 |
| Glyceryl-lacto esters of fatty acid, lipophilic emulsifier(g) | 0.5000 |
| Octaglycerol monooleate, hydrophilic emulsifier (HLB = 13.0) | 2.0000 |
| Beta carotene (30% in oil) | 0.0050 |
| Salt | 1.6500 |
| Butter flavor | 0.0200 |
| Stabilizer(c) | 1.0000 |
| Stabilizer(d) | 0.4000 |
| Water | 76.6743 |
| Potassium sorbate | 0.1300 |
| Sodium benzoate | 0.1000 |
| Phosphoric acid | 0.0150 |
| Calcium disodium EDTA | 0.0057 |

(c) and (d): see Example I.
(g)Durlac 100 WK

The resulting solidified spread exhibits a penetrometer reading of 117 units when measured as in Example I.

EXAMPLE VII

This example describes the preparation of another spread according to the present invention, but this time employing soybean oil and employing a lower level of polysorbate 60 than in Example I. The process is the same as in Example I. The spread is made from the following materials which are employed in the amounts listed:

| Ingredient | Amount (parts by wt.) |
| --- | --- |
| Soybean oil, partially hydrogenated(h) | 19.2500 |
| Mono- and diglycerides(a) | 0.5000 |
| Polysorbate 80(b) | 0.2500 |
| Beta carotene (30% in oil) and vitamins | 0.0050 |
| Salt | 1.6500 |
| Butter flavor | 0.0200 |
| Stabilizer(c) | 1.0000 |
| Stabilizer(d) | 0.4000 |
| Water | 76.6743 |
| Potassium sorbate | 0.1300 |
| Sodium benzoate | 0.1000 |
| Phosphoric acid | 0.0150 |
| Calcium disodium EDTA | 0.0057 |

(a), (b), (c) and (d): see Example I.
(h)TEM-Plus 95, Swift, Inc.

The resulting spread exhibits a penetrometer reading of 199 units when measured as described in Example I.

EXAMPLE VIII

This example describes the preparation of another spread according to the present invention, but this time employing polysorbate 80 in place of the low level of polysorbate 60 in Example VII. The process is the same as in Example VII. The spread is made from the following materials which are employed in the amounts listed:

| Ingredient | Amount (parts by wt.) |
| --- | --- |
| Coconut oil, 92° F. Wiley melting point | 19.2500 |
| Mono- and diglycerides(a) | 0.5000 |
| Polysorbate 80(i) | 0.2500 |
| Beta carotene (30% in oil) and vitamins | 0.0050 |
| Salt | 1.6500 |
| Butter flavor | 0.0200 |
| Stabilizer(c) | 1.0000 |
| Stabilizer(d) | 0.4000 |
| Water | 76.6743 |
| Potassium sorbate | 0.1300 |
| Sodium benzoate | 0.1000 |
| Phosphoric acid | 0.0150 |
| Calcium disodium EDTA | 0.0057 |

(a), (c) and (d): see Example I.
(i)Durfax 80

The resulting spread exhibits a penetrometer reading of 182 units when measured as in Example I.

EXAMPLE IX

A comparison is made between the product prepared according to Example I, conventional margarine products (both soft and stick) and a commercial diet margarine substitute. Margarine will typically contain:

| Ingredient | Amount (parts by wt.) |
| --- | --- |
| Partially Hydrogenated Vegetable Oil | 80.000 |
| Lecithin | 0.100 |
| Mono- & Diglycerides | 0.150 |
| Color, Flavor, Vitamins | 0.020 |
| Dairy Solids | 1.600 |
| Salt | 2.000 |
| Water | 16.130 |

To prepare the margarine it will typically be processed by blending oil (130° F.) and water (50° F.) phases either in-line or in an emulsion tank. The emulsion is pumped through a series of cooling scraped surface heat exchangers (usually 3). A blender ("B" unit) is usually positioned between the second and third heat exchanger or after the third heat exchanger, to aid in promoting crystallization. The product is normally filled in the 40°–50° F. range.

The margarines made in this manner are available in two general types—soft, which is sold in small plastic dishes called tubs; and stick, which is sold in sticks like butter. A diet margarine substitute will typically contain:

| Ingredient | Amount (parts by wt.) |
| --- | --- |
| Partially hydrogenated vegetable oil | 39.40 |
| Monoglycerides | 0.50 |
| Lecithin | 0.10 |
| Vitamin, Color, and Flavor Mix | 0.01 |
| Water | 57.78 |
| Salt | 2.00 |
| Preservatives | 0.21 |

To prepare the diet margarine substitute a water-in-oil emulsion is prepared by blending the oil phase (120° F.) with the water phase (95° F.) in an emulsion tank. The emulsion is pumped through a series of cooling, scraped-surface heat exchangers (usually 3). A blender ("B" unit) is usually positioned between the second and third heat exchanger or after the third heat exchanger, to aid in promoting crystallization. The product is normally filled in the 70°–75° F. range. Diet products processed in this manner are normally available only in the soft form, which is sold in small plastic dishes called tubs. Taking the product produced in Example I, a commercial soft margarine, a commercial stick margarine and a commercial diet margarine substitute, the penetrometer readings are taken as discussed in Example I.

| Penetrometer Data (40° F.) | | |
| --- | --- | --- |
| | Range | Average |
| Example I | 117–143 | 130 |
| Soft Margarine | 103–174 | 131 |
| Stick Margarine | 80–133 | 113 |
| Diet Margarine substitute | 135–180 | 155 |

The above description is for the purpose of teaching the person skilled in the art how to practice the present invention. This description is not intended to detail all of the obvious modifications and variations of the invention which will become apparent upon reading. However, applicants do intend to include all such obvious modifications and variations within the scope of their invention which is defined by the following claims.

What is claimed is:

1. A low-fat, butter-flavored spread comprising: butter flavor; a dispersed phase comprising from 5 to 40%, based on the weight of the spread, of fat having an SFI profile with the following ranges

50° F.-40–80%

70° F.-25–50%

92° F.-<10%;

a continuous aqueous phase including a stabilizer; and an emulsifier system comprising a combination of a lipophilic emulsifier and a hydrophilic emulsifier, the emulsifier system being present in an amount of from 0.3 to 4.0%, based on the total weight of the spread, and each of the lipophilic and hydrophilic emulsifiers are present at levels of at least 0.05% on the same basis; the relative and total amounts of the emulsifiers and the stabilizer being effective to provide a stable emulsion and a product which is solid at 40° F.

2. A low-fat, butter-flavored spread according to claim 1 wherein the fat comprises from 10 to 30% of the total weight of the spread.

3. A low-fat, butter-flavored spread according to claim 1 wherein the fat comprises a partially-hydrogenated vegetable oil having an SFI profile with the following ranges:

50° F.-50–70%

70° F.-30–40%

92° F.-<5%.

4. A low-fat, butter-flavored spread according to claim 1 which exhibits a penetrometer reading at 40° F. within the range of 60 to 250 units using a standard penetrometer cone, having a 2.5 inch diameter and a 45° angle, with 47.5 grams added weight at a 5-second interval.

5. A low-fat, butter-flavored spread according to claim 4, which exhibits a penetrometer reading within the range of 100 to 200 units under the same conditions.

6. A low-fat, butter-flavored spread according to claim 1 wherein the hydrophilic emulsifier comprises a member selected from the group consisting of polyoxyethylene (20) sorbitan monostearate, polyoxyethylene (20) sorbitan monooleate, and mixtures of these.

7. A low-fat, butter-flavored spread according to claim 1 wherein the hydrophilic emulsifier comprises polyoxyethylene (20) sorbitan tristearate.

8. A low-fat, butter-flavored spread according to claim 1 wherein the hydrophilic emulsifier comprises octaglycerol monooleate.

9. A low-fat, butter-flavored spread according to claim 1 having less than 40% by volume of gas incorporated therein.

10. A low-fat, butter-flavored spread according to claim 1 wherein the stabilizer comprises from 0.1 to 3.0% of the total weight of the spread.

11. A low-fat, butter-flavored spread according to claim 1 wherein the emulsifier system is present at a level of from 0.5 to 2.0%, and the lipophilic and hydrophilic emulsifiers are each present at levels of at least 0.1%, all percentages based on the total weight of the spread.

12. A low-fat, butter-flavored spread according to claim 11 which is solid at 70° F.

13. A low-fat, butter-flavored spread according to claim 12 wherein the stabilizer comprises from 0.1 to 3.0% of the total weight of the spread.

14. A process for preparing a low-fat, butter-flavored spread, which comprises: preparing an oil-in-water emulsion comprising blending and emulsifying butter flavor, a dispersed phase comprising from 5 to 40%, based on the weight of the emulsion, of fat having an SFI profile with the following ranges
  50° F. - 40-80%
  70° F. - 25-50%
  92° F. - <10%,
a continuous aqueous phase including a stabilizer, and an emulsifier system comprising a combination of a lipophilic emulsifier and a hydrophilic emulsifier, the emulsifier system being present in an amount of from 0.3 to 4.0%, based on the total weight of the spread, and each of the lipophilic and hydrophilic emulsifiers are present at levels of at least 0.05% on the same basis, and the relative and total amounts of the emulsifiers and the stabilizer being effective to provide a stable emulsion and a product which is solid at 40° F.; and cooling the emulsion under conditions effective to solidify it to form a product which is solid at 40° F.

15. A process according to claim 14 wherein the emulsion is agitated after cooling to promote crystallization and enhance solidification.

16. A process according to claim 14 wherein all of the ingredients are thoroughly blended, at a temperature sufficient to maintain the fat in a liquid state, prior to emulsification.

17. A process according to claim 16 wherein the emulsion is rapidly cooled to a temperature below 70° F. after emulsification.

18. A process according to claim 17 wherein the emulsion is agitated after cooling to a temperature of 50° F. or less.

19. A process according to claim 14 wherein the fat comprises from 10 to 30% of the total weight of the spread.

20. A process according to claim 14 wherein the fat comprises a partially-hydrogenated vegetable oil having an SFI profile with the following ranges:
  50° F. - 50-70%
  70° F. - 30-40%
  92° F. - <5%

21. A process according to claim 14 wherein the hydrophilic emulsifier comprises a member selected from the group consisting of polyoxyethylene (20) sorbitan monostearate, polyoxyethylene (20) sorbitan monooleate, and mixtures of these.

22. A process according to claim 14 wherein the hydrophilic emulsifier comprises polyoxyethylene (20) sorbitan tristearate.

23. A process according to claim 14 wherein the hydrophilic emulsifier comprises octaglycerol monooleate.

24. A process according to claim 14 wherein the spread has less than 40% by volume of gas incorporated therein.

25. A process according to claim 14 wherein the stabilizer comprises from 0.1 to 3.0% of the total weight of the spread.

26. A process according to claim 14 wherein the spread is solid at 70° F.

27. A process according to claim 14 wherein the emulsifier system is present at a level of from 0.5 to 2.0%, and the lipophilic and hydrophilic emulsifiers are each present at levels of at least 0.1%, all percentages based on the total weight of the spread.

28. A process according to claim 27 wherein the spread is solid at 70° F.

29. A process according to claim 28 wherein the stabilizer comprises from 0.1 to 3.0% of the total weight of the spread.

30. A process according to claim 29 wherein the hydrophilic emulsifier comprises a member selected from the group consisting of polyoxyethylene (20) sorbitan monostearate, polyoxyethylene (20) sorbitan monooleate, and mixtures of these.

* * * * *

UNITED STATES PATENT AND TRADEMARK OFFICE
CERTIFICATE OF CORRECTION

PATENT NO. : 4,279,941
DATED : July 21, 1981
INVENTOR(S) : Peter M. Bosco et al.

It is certified that error appears in the above—identified patent and that said Letters Patent is hereby corrected as shown below:

The term of this patent subsequent to June 16, 1998 has been disclaimed.

Signed and Sealed this

Thirteenth Day of October 1981

[SEAL]

*Attest:*

GERALD J. MOSSINGHOFF

*Attesting Officer* — *Commissioner of Patents and Trademarks*